United States Patent
Siddaiah

(10) Patent No.: US 10,541,897 B2
(45) Date of Patent: Jan. 21, 2020

(54) MISMATCH COMPENSATION AT DIFFERENTIAL SIGNAL RECEIVER

(71) Applicant: Western Digital Technologies, Inc., Irvine, CA (US)

(72) Inventor: Vinay Siddaiah, Bangalore (IN)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 186 days.

(21) Appl. No.: 15/596,617

(22) Filed: May 16, 2017

(65) Prior Publication Data

US 2018/0337865 A1 Nov. 22, 2018

(51) Int. Cl.
*G11C 7/00* (2006.01)
*H04L 12/26* (2006.01)

(52) U.S. Cl.
CPC ................ *H04L 43/0852* (2013.01)

(58) Field of Classification Search
CPC .... H04L 47/283; H04L 47/56; H04L 43/0852
See application file for complete search history.

(56) References Cited

U.S. PATENT DOCUMENTS

| | | |
|---|---|---|
| 5,608,757 A | 3/1997 | Smith et al. |
| 5,828,699 A | 10/1998 | Heinemann |
| 6,026,051 A | 2/2000 | Keeth et al. |
| 6,680,636 B1 | 1/2004 | Parry et al. |
| 9,521,058 B2 | 12/2016 | Pandey et al. |
| 2003/0102933 A1 | 6/2003 | Partanen |
| 2006/0245845 A1 | 11/2006 | Martin et al. |
| 2009/0204934 A1 | 8/2009 | Lin |
| 2010/0001776 A1 | 1/2010 | Nakamura et al. |
| 2010/0272216 A1 | 10/2010 | Liebowitz et al. |
| 2012/0081981 A1 | 4/2012 | Oh |
| 2012/0256805 A1 | 10/2012 | Orihashi |
| 2013/0156088 A1 | 6/2013 | Jin et al. |
| 2014/0119141 A1 | 5/2014 | Tamlyn et al. |
| 2014/0334583 A1 | 11/2014 | Lee |
| 2015/0100815 A1* | 4/2015 | Xanthopoulos ........ G11C 7/222 713/503 |
| 2015/0124536 A1* | 5/2015 | Jung ....................... G11C 7/222 365/189.05 |
| 2017/0277820 A1 | 9/2017 | Shen et al. |
| 2018/0350415 A1* | 12/2018 | Yoon ........................ G11C 8/18 |

* cited by examiner

*Primary Examiner* — Mohammed A Bashar

(74) *Attorney, Agent, or Firm* — Loza & Loza, LLP; Gabriel Fitch

(57) ABSTRACT

A non-volatile memory module includes an input/output buffer coupled to first and second signal transmission paths, and control circuitry coupled to the input/output buffer, the control circuitry being configured to receive a first signal on the first signal transmission path, receive a second signal on the second signal transmission path, determine a delay between the first signal and the second signal, generate a delay mismatch value based on the determined delay, and transmit the delay mismatch value on one or more signal transmission paths coupled to the input/output buffer.

21 Claims, 6 Drawing Sheets

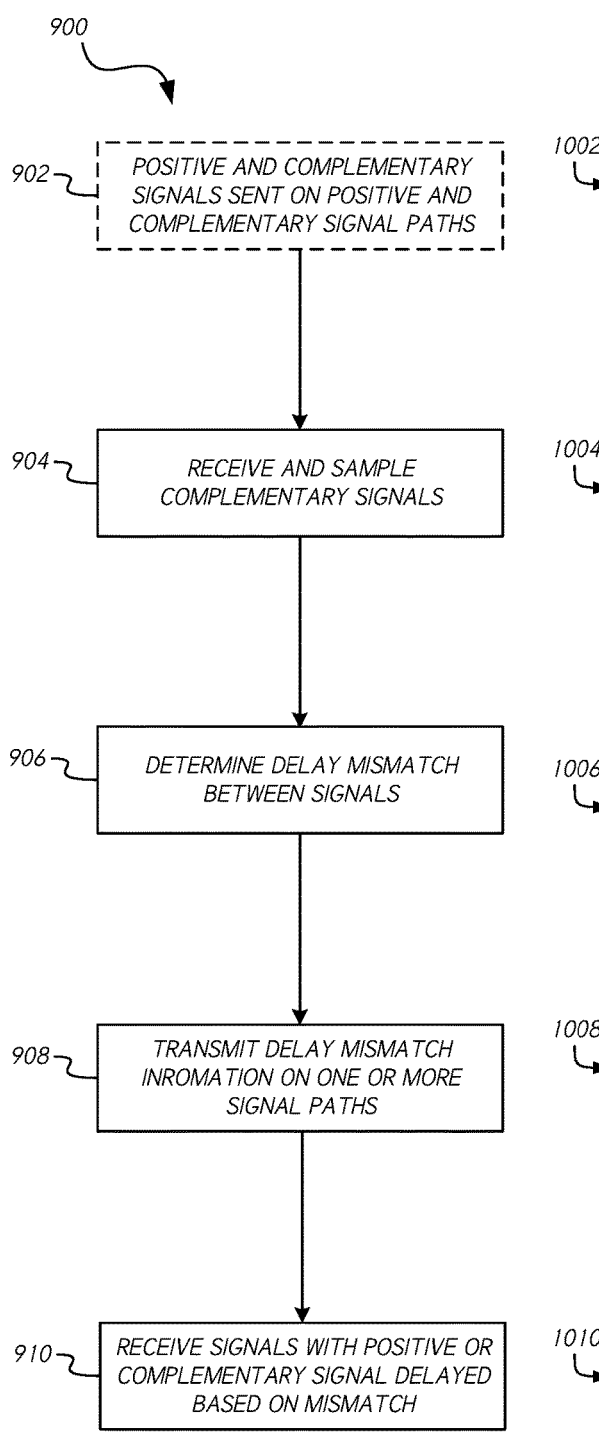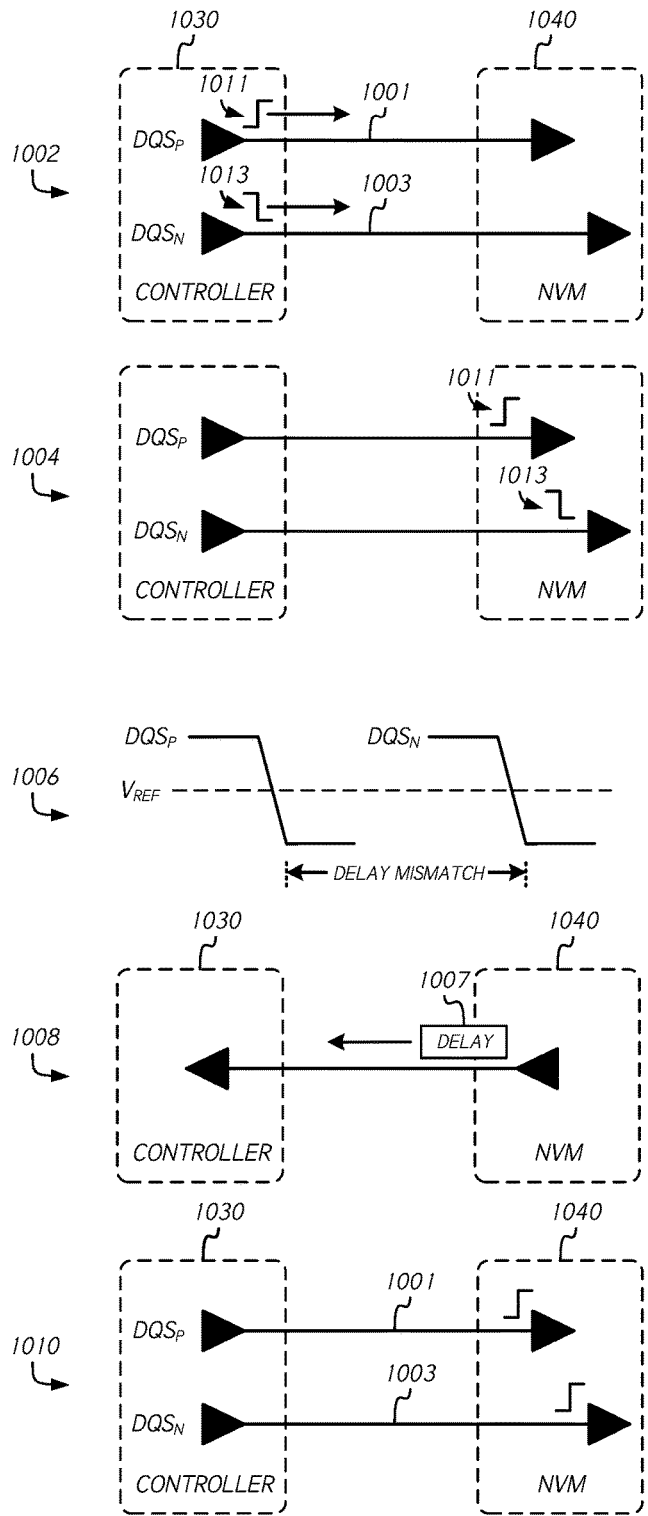
FIG. 9
FIG. 10

MISMATCH COMPENSATION AT DIFFERENTIAL SIGNAL RECEIVER

BACKGROUND

Field

This disclosure relates to computing devices and systems. More particularly, the disclosure relates to systems and methods for communicating differential signals in data storage devices and other computing devices and systems.

Description of Related Art

In certain computing systems, such as data storage systems, differential signaling can be used to improve signal integrity and/or for other purposes. However, where the signal paths used to transmit the differential signals are mismatched, signal integrity can be compromised.

SUMMARY

In some implementations, the present disclosure relates to a non-volatile memory module, or other module of a computing device or system, configured to implement differential signal mismatch compensation with respect to communications between the non-volatile memory module and a data storage controller, or other component of a computing device or system that is communicatively coupled to the non-volatile memory module. For example, some embodiments provide a non-volatile memory module comprising an input/output buffer coupled to first and second signal transmission paths, and control circuitry coupled to the input/output buffer, the control circuitry being configured to receive a first signal on the first signal transmission path, receive a second signal on the second signal transmission path, determine a delay between the first signal and the second signal, generate a delay mismatch value based on the determined delay, and transmit the delay mismatch value on one or more signal transmission paths coupled to the input/output buffer.

Transmitting the delay mismatch value may involve transmitting the delay mismatch value to a controller chip communicatively coupled to the non-volatile memory module. The first and second signals may be received from the controller chip. In certain embodiments, the control circuitry is further configured to, after transmitting the delay mismatch value, receive a true signal of a complementary signal pair on the first signal transmission path, and receive a complementary signal of the complementary signal pair on the second signal transmission path. One of the true signal and the complementary signal may be delayed in accordance with the delay mismatch value. The first and second signal transmission paths may be at least partially integrated with a printed circuit board on which at least one of the non-volatile memory module and the controller chip is mounted.

In certain embodiments, the control circuitry is further configured to determine the delay based on a difference in a receipt time associated with the first signal and a receipt time associated with the second signal. The first and second signals can be pulse signals. The first signal may be a true signal of a differential timing signal and the second signal is a complementary signal of the differential timing signal. In certain embodiments, the delay mismatch value is positive when the first signal is received prior to receiving the second signal, and the delay mismatch value is negative when the second signal is received prior to receiving the first signal.

The control circuitry may be further configured to transmit the delay mismatch value as a digital signal. For example, the delay mismatch value may comprise a sequence of bits.

In some implementations, the present disclosure relates to a method for compensating for a delay mismatch in signal transmission paths. The method comprises receiving, at an input/output buffer, a first signal on a first signal transmission path, receiving, at the input/output buffer, a second signal on a second signal transmission path, determining a delay between the first signal and the second signal, generating a delay mismatch value based on the determined delay, and transmitting the delay mismatch value on one or more signal transmission paths coupled to the input/output buffer.

The method may further comprise, after transmitting the delay mismatch value, receiving a true signal of a complementary signal pair on the first signal transmission path, and receiving a complementary signal of the complementary signal pair on the second signal transmission path, wherein one of the true signal and the complementary signal is delayed in accordance with the delay mismatch value. In certain embodiments, determining the delay is based on a difference in a receipt time associated with the first signal and a receipt time associated with the second signal. The delay mismatch value may be transmitted as a digital signal.

In some implementations, the present disclosure relates to a computing device comprising an input/output buffer coupled to first and second signal transmission paths, and control circuitry coupled to the input/output buffer, the control circuitry being configured to receive a first signal on the first signal transmission path, receive a second signal on the second signal transmission path, determine a delay between the first signal and the second signal, generate a delay mismatch value based on the determined delay, and transmit the delay mismatch value on one or more signal transmission paths coupled to the input/output buffer.

The control circuitry may be further configured to, after transmitting the delay mismatch value, receive a true signal of a complementary signal pair on the first signal transmission path, and receive a complementary signal of the complementary signal pair on the second signal transmission path, wherein one of the true signal and the complementary signal is delayed in accordance with the delay mismatch value. In certain embodiments, transmitting the delay mismatch value involves transmitting the delay mismatch value to a computing module communicatively coupled to the computing device, and the first and second signals are received from the computing module. The first and second signal transmission paths can be at least partially integrated with a printed circuit board on which at least one of the computing device and the computing module is mounted.

In certain embodiments, the control circuitry is further configured to determine the delay based on a difference in a receipt time associated with the first signal and a receipt time associated with the second signal. The first and second signals may be pulse signals. In certain embodiments, the first signal is a true signal of a differential timing signal and the second signal is a complementary signal of the differential timing signal.

In some implementations, the present disclosure relates to a non-volatile memory module comprising an input/output buffer coupled to first and second signal transmission paths and configured to receive a first signal on the first signal transmission path and a second signal on the second signal transmission path, and means for determining a delay between the first signal and the second signal, generating a delay mismatch value based on the determined delay, and transmitting the delay mismatch value on one or more signal transmission paths coupled to the input/output buffer.

In certain embodiments, the means for determining the delay comprises control circuitry of the non-volatile memory module. The delay may be based on a difference in a receipt time associated with the first signal and a receipt time associated with the second signal. The first and second signals may be pulse signals. In certain embodiments, the first signal is a true signal of a differential timing signal and the second signal is a complementary signal of the differential timing signal.

BRIEF DESCRIPTION OF THE DRAWINGS

Various embodiments are depicted in the accompanying drawings for illustrative purposes, and should in no way be interpreted as limiting the scope of this disclosure. In addition, various features of different disclosed embodiments can be combined to form additional embodiments, which are part of this disclosure.

FIG. 9 is a flow diagram illustrating a process for implementing differential mismatch compensation in accordance with one or more embodiments.

FIG. 10 illustrates block diagrams corresponding to the various steps of the process of FIG. 9 in accordance with one or more embodiments.

DETAILED DESCRIPTION

Figure 1:
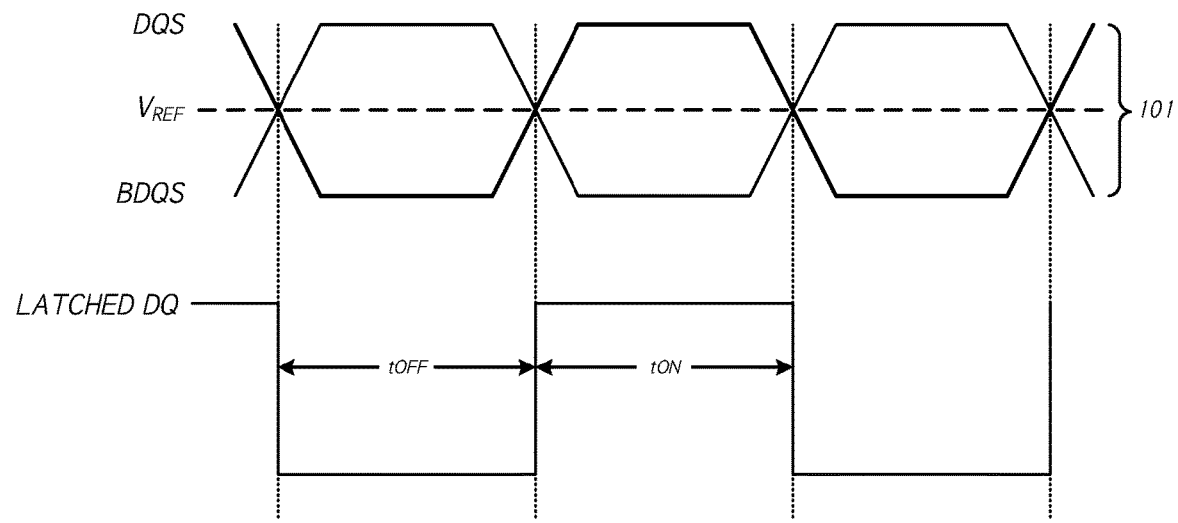
FIG. 1 illustrates a timing diagram for a differential timing signal in accordance with one or more embodiments.

While certain embodiments are described, these embodiments are presented by way of example only, and are not intended to limit the scope of protection. Indeed, the novel methods and systems described herein may be embodied in a variety of other forms. Furthermore, various omissions, substitutions and changes in the form of the methods and systems described herein may be made without departing from the scope of protection.

The headings provided herein are for convenience only and do not necessarily affect the scope or meaning of the claims. Disclosed herein are example configurations and embodiments relating to backing up data in a computing system.

Overview

In computing devices and systems, data may be communicated between components of the system or device through the transmission of signals on one or more data communication/transmission paths. Electronic signal paths may comprise conductive transmission lines or traces, for example. As one example implementation of data communication in a computing system, operation of a data storage device may involve the communication of data between a controller of the data storage device and one or more memory modules or components associated therewith via a data bus that couples the controller and the memory module(s). The data values communicated may be provided to, or received from, the data bus at a transfer rate based on a frequency of a clock or other timing signal (e.g., strobe signal). For example, in one implementation, data values may be provided to the data bus in response to a rising edge of the timing signal, while data values may be received from the data bus in response to a falling edge of the clock and having signal, or vice versa. Communication of timing signals among components of the data storage device or system may be necessary or desirable to enable reliable transmission and/or sampling of data over data buses connecting such components. The terms "clock," "clock signal," "timing signal," "strobe," "strobe signal," and the like are used herein according to their broad and/or ordinary meanings, and may be used to refer to any type of synchronous digital signal that oscillates or toggles between high- and low-value states to coordinate operations within a computing device or system. Therefore, although the term "clock" may be used herein and connection with certain embodiments, should be understood that such references may refer to any type of digital timing signal as described herein. Furthermore, the term "timing signal," as used herein, may generally refer to a clock signal, strobe signal, or any other type of synchronous timing signal.

In some data communication systems, differential signaling may be utilized in order to reduce the effects of electromagnetic noise and/or otherwise improve signal integrity. Where components of a computing system/device communicate using differential signaling, data may be transmitted between the components using two complementary signals (i.e., signal pair), wherein the receiving component is configured to interpret the electrical difference between the two signals, rather than the difference between a single signal and a ground reference as in single-ended signaling. As an example, in a computing system comprising a printed circuit board on which a plurality of components of the system are mounted, differential pair transmission paths may be at least partially integrated in one or more layers of the printed circuit board between the components, such as through the use of microstrip and/or strip line differential pair routing. Certain embodiments of the present disclosure relate to computing devices/systems that are configured to transmit clock/timing signals using differential signaling. For example, a first differential signal transmission path may be used to send a first signal (e.g., "true" or "positive" signal), while another signal path may be used to send an inverted version of the first signal (e.g., "complementary" or "negative" signal). For example, with respect to timing signals, the complementary signal may resemble a copy of the true signal, wherein the complementary signal and the true signal are out of phase by approximately 180°. The terms "complementary signals" and "differential signals," "differential pair" and "differential pair of signals" are used herein according to their broad and ordinary meanings, and may be used to refer to a pair of signals having a substantially inverse relationship with respect to one another, such that where one of the signals has a positive value at a given time, the other signal has a negative value of substantially the same absolute value or magnitude.

With respect to the transmission of complementary clock signals in computing devices/systems, in some implementations, data may be transmitted and/or sampled in connection with the crossing of a voltage reference level ("Vref") by one or both of the complementary signals. For example, the voltage reference level may be associated with a midpoint between a logical high voltage value and a logical low-voltage value of the differential signals, which may generally correspond to a voltage of approximately 0 V (i.e., ground reference). The crossover point of the complementary signals (i.e., voltage level of the signals where they cross when transitioning from a logical high to a logical low value, and vice versa) may generally align with the voltage reference level when the signals are perfectly in phase. However, where transmission path mismatch is present on the complementary signal path relative to the true signal path, the crossover point of the signal pair may be offset from the voltage reference level. Such offset may be referred to herein as the voltage crossover offset ("VIX"). The presence of VIX offset in certain computing systems/devices can result in reduced set-up and hold time at the receiver, and/or other performance issues. As signaling speed increases, the presence of VIX offset can result in significant reduction in timing, which may limit higher frequency of operation for the data transmission interface. VIX offset may be due at least in part to length mismatch between differential pair signal paths (e.g., signal routing in the package and/or board). For example, relatively small form factor products may incorporate relatively dense signal routing, resulting in signal path length mismatch within computer chips (e.g., application-specific integrated circuits (ASIC), memory chips/devices, etc.) and/or circuit board traces connecting such components, which can make tighter matching between differential pair signal paths challenging to implement. Signal path mismatch, in addition to causing timing violations for the differential signals, can result in increased differential-to-common-mode conversion, thereby reducing the efficiency of the differential signal.

In some implementations, voltage crossover offset (VIX) can be maintained within an acceptable range by length-matching the signal paths within a fixed value. However, on relatively small form factor packages, achieving acceptable matching of signal path lengths can be challenging, and may introduce package-designing complications. Furthermore, as signaling speeds increase, such approaches may become inadequate in some designs. In some implementations, computing device packages may be built to account for non-tunable mismatches, such as mismatches within board (e.g., printed circuit board (PCB) signal paths). In some implementations, relatively tighter length matching may be achieved using package and/or PCB designs incorporating increased layer count.

In some implementations, the present disclosure relates to systems, devices, and/or methods for implementing differential signaling incorporating mismatch compensation. For example, such mismatch compensation may involve implementing differential pair training, such as in connection with booting of the computing device or system. Such training may substantially correct certain effects associated with transmission path mismatches on the board and/or within certain computing chips (e.g. ASIC and/or memory chip(s), such as NAND). In some implementations, mismatch compensation can be achieved through the use of one or more phase shifters in the digital domain of a signal transmission component. A phase shifter, such as a delay-locked loop (DLL), may shift one of the differential pair signals to compensate for the mismatch in the transmission channels between the sender component and the receiver component. Such mismatch compensation may ultimately minimize voltage crossover offset and/or allow such offset to be maintained within an acceptable range.

In some implementations, differential mismatch compensation in accordance with the present disclosure may be implemented in a data storage system with respect to differential signaling between a controller (e.g., ASIC) and a nonvolatile memory module, device or system (e.g., NAND). For example, the relevant differential signaling may be with respect to transmission of a write clock signal differential pair (DQS/BDQS) and/or a read clock signal differential pair (RE/BRE), which may be transmitted from the controller to the memory module. Differential mismatch compensation may be achieved by introducing a delay in one of the signals of the differential pair, such as by a few picoseconds, or other value, depending on the determined length mismatch. Such delay may allow for the differential signals to arrive at the receiver at substantially the same time in spite of the mismatch, thereby potentially reducing voltage crossover offset errors. Differential mismatch compensation in accordance with embodiments disclosed herein may be implemented in one or both of the controller and associated memory module of a data storage device or system. For example, hardware and/or software logic may be incorporated in one or both of the controller and memory module in order to implement training and/or signal delaying in accordance with the present disclosure. Differential mismatch compensation training may be implemented in accordance with one or more events, such as in response to a system boot-up of the data storage device, computing device, or other component. In some implementations, differential mismatch compensation training is performed during normal operation, which may allow for compensation for changes in process, voltage, and/or temperature.

As toggle mode speeds of data storage systems and/or other computing systems increase, the significance of differential mismatch may likewise increase. Although increased layer counts and other solutions may be implemented in order to improve differential matching, such increases in layer count and/or other physical design-based solutions can result in undesirable increased costs and/or complexity, placing burden on design engineers. However, differential mismatch training in accordance with the present disclosure can provide reduction in voltage-crossover-offset-related failures substantially without the need to increase layer count or other design complexity, and may therefore provide a relatively reduced-cost and/or -complexity solution for addressing differential mismatch issues.

Particular aspects of the present disclosure are described herein with reference to the drawings. In the present disclosure, common features may be designated by common reference numbers. Although certain examples are described herein with reference to a data storage device, it should be appreciated that techniques described herein are applicable to other implementations. Furthermore, it is to be appreciated that certain ordinal terms (e.g., "first" or "second") may be provided for ease of reference and do not necessarily imply physical characteristics or ordering. Therefore, as used herein, an ordinal term (e.g., "first," "second," "third,"

etc.) used to modify an element, such as a structure, a component, an operation, etc., does not necessarily indicate priority or order of the element with respect to any other element, but rather may generally distinguish the element from another element having a same name (but for use of the ordinal term). In addition, as used herein, indefinite articles ("a" and "an") may indicate "one or more" rather than "one." Further, an operation performed "based on" a condition or event may also be performed based on one or more other conditions or events not explicitly recited. As used herein, "exemplary" may indicate an example, an implementation, and/or an aspect, and should not be construed as limiting or as indicating a preference or a preferred example, implementation, and/or aspect.

Although certain embodiments are disclosed herein in the context of solid-state data storage devices and systems, it should be understood that certain features disclosed herein may be applicable devices/systems incorporating one or more other types of data storage, such as magnetic media, or other volatile or nonvolatile memory. As used in this application, "nonvolatile solid-state memory," "nonvolatile memory," "NVM," or variations thereof may refer to solid-state memory such as NAND flash. However, the systems and methods of this disclosure may also be useful in more conventional hard drives and hybrid drives including both solid-state and hard drive components. Solid-state memory may comprise a wide variety of technologies, such as flash integrated circuits, Phase Change Memory (PC-RAM or PRAM), Programmable Metallization Cell RAM (PMC-RAM or PMCm), Ovonic Unified Memory (OUM), Resistance RAM (RRAM), NAND memory, NOR memory, EEPROM, Ferroelectric Memory (FeRAM), MRAM, or other discrete NVM (nonvolatile solid-state memory) chips. The nonvolatile solid-state memory arrays or storage devices may be physically divided into planes, blocks, pages, and sectors, as is known in the art. Other forms of storage (e.g., battery backed-up volatile DRAM or SRAM devices, magnetic disk drives, etc.) may additionally or alternatively be used.

Delay Mismatch in Complementary Signals

FIG. 1 illustrates a timing diagram for a differential timing signal 101, such as clock signal or the like. For example, the differential signal 101 may be a timing signal for use in a data storage system, as described herein. In certain embodiments, the differential signal 101 includes a true signal DQS and a complementary signal BDQS, which is a substantially inverted version of the signal DQS. The differential signal 101 may be used for signaling write operations, or other operations, in a data storage device or other computing system. Alternatively, the signal 101 may be for read operations executed in a memory module. The signals 101 may provide data output timing to data output buffers. Each of the signals of the timing signal pair 101, as shown, is designed to transition from a logical low value to a logical high value, and vice versa. The timing signal 101 may be used to communicate timing/sampling information from a controller of a data storage system to and/or from a memory module (e.g., memory chip/die). The timing signal 101 may be generated within the controller of the data storage system.

Data may be latched in one or more components of the relevant system based on the rising and/or falling edge of one or both of the complementary signals 101. The signals 101 may be used to latch data in any suitable or desirable manner; an example latch output signal is shown in FIG. 1 and identified as "Latched DQ." In one embodiment, the latched DQ is triggered by the crossing of the voltage reference level (Vref) by one or both of the differential signals. In one implementation, where the DQS is falling and the BDQS is rising, the latched DQ signal may be latched in connection with the crossing of the BDQS signal and Vref when Latched DQ is rising, and in connection with the crossing of the DQS signal with Vref when Latched DQ is falling.

Figure 2:
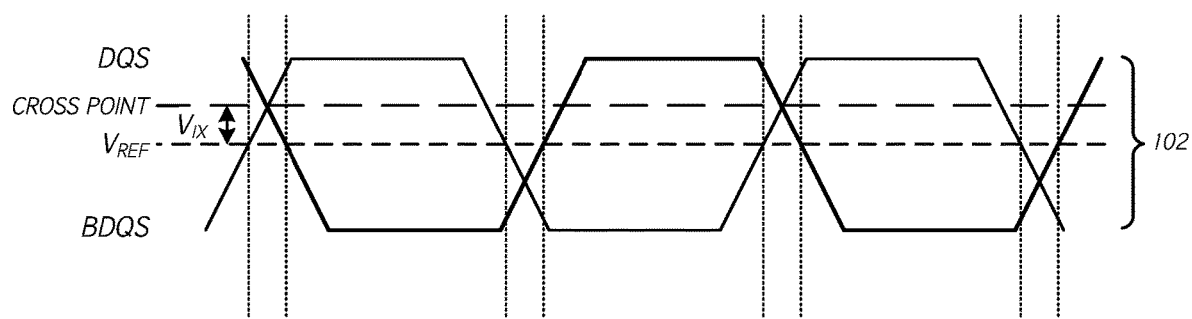
FIG. 2 illustrates a timing diagram for a differential timing signal, wherein the complementary signals are at least partially skewed relative to one another in accordance with one or more embodiments.

Each of the signals of the signal pair 101 may be transmitted between, for example, the controller of a data storage system and a memory module thereof along a separate signal transmission path. For example, at least a portion of such path may be integrated with a printed circuit board (PCB) or other substrate to which the various components are mounted or otherwise associated. However, as described above, physical and/or other mismatches between the separate signal paths may result in a skew or delay between the complementary signals as seen at the receiver of the system. FIG. 2 illustrates a timing diagram wherein the complementary signals 102 are at least partially skewed relative to one another, such that the cross point of the signals is not at the midpoint Vref. Rather, the cross point is offset by a distance VIX from the voltage reference level Vref. Such voltage cross point offset VIX may result in reduced set-up and/or hold time while latching data at the receiver, and/or other issues or inefficiencies. Voltage crossover offset VIX can negatively impact the duty cycle of the latched signal. As backend speed increases, the presence of voltage crossover offset can cause significant reduction in timing, which may limit higher-frequency operation for the indication interface.

As described herein, a primary cause of voltage crossover offset may be length mismatch between the differential signal paths, which may be due at least in part to the routing design of the circuit board or package. For example, relatively small form factor products may require relatively dense routing configurations, resulting in routing mismatch inside of controller and/or memory chips and/or other board or substrate through which the signals are routed.

Figure 3A:
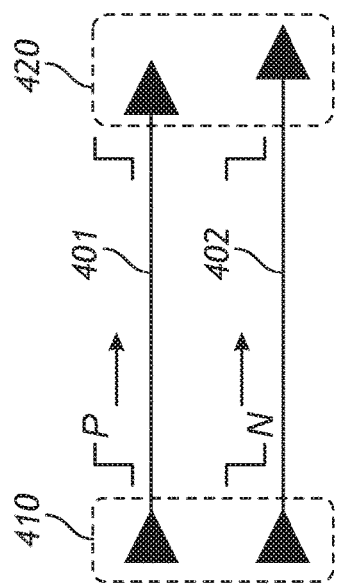
FIG. 3A illustrates a pair of transmission paths for differential signal transmission in accordance with one or more embodiments.
Figure 4A:
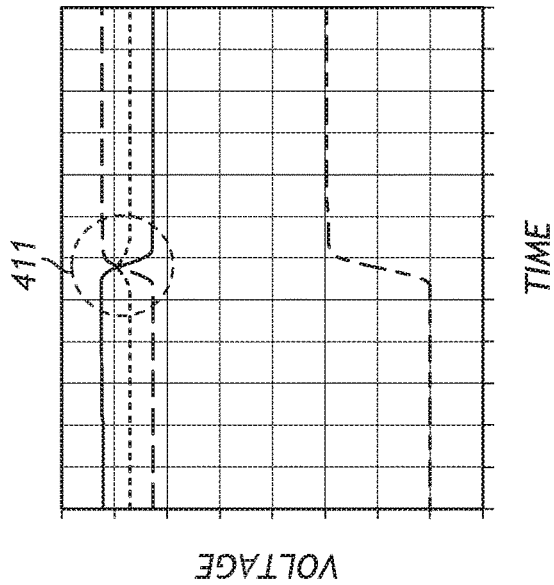
FIGS. 4A and 4B are graphs illustrating differential signal values in accordance with one or more embodiments.

In addition to causing timing violations, skew between complementary signals can affect the common mode signal, such that the common mode of the signal is not maintained at a zero-voltage state. FIG. 3A illustrates a pair of transmission paths 301 (e.g., positive DQS), 302 (e.g., negative DQS), wherein a positive signal P is transmitted on the first transmission path 301 and an inverted version N of the positive signal is transmitted on the second transmission path 302 between a transmitter 310 and a receiver 320. Because the first transmission path 301 and second transmission path 302 are equally matched with respect to length, the positive signal P and the negative signal N arrive at the receiver 320 at substantially the same time such that, as viewed by the receiver, the signals are in-phase and have a substantially constant common mode value of zero. FIG. 4A is a graph illustrating the received positive waveform P, negative waveform N, and associated common mode signal CM at the receiver 320, as well as the differential signal D between the positive and negative signals for the example of FIG. 3A.

Figure 3B:
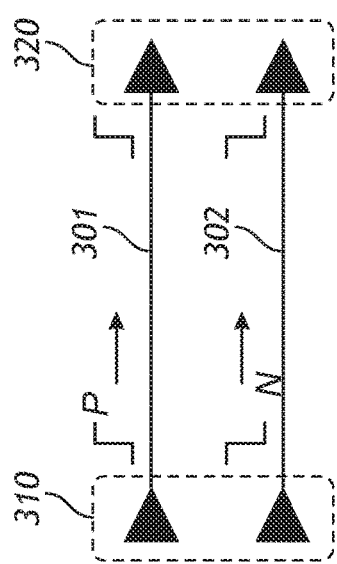
FIG. 3B illustrates a pair of transmission paths having mismatched lengths in accordance with one or more embodiments.
Figure 4B:
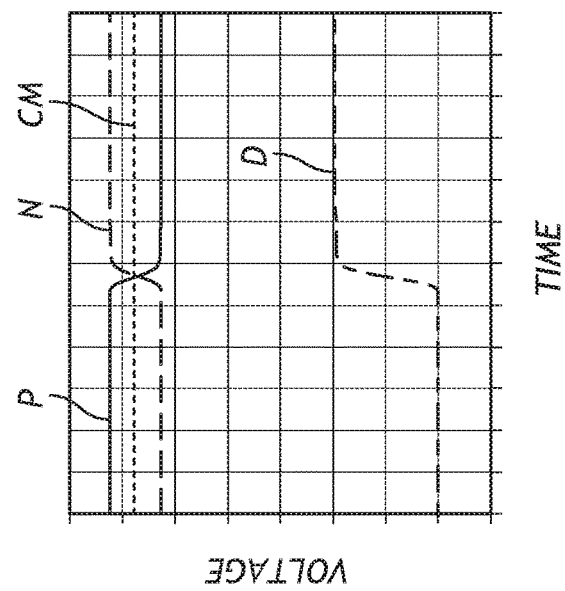

FIG. 3B illustrates a pair of transmission paths 401, 402, wherein the transmission paths are not perfectly matched. That is, as illustrated, length mismatch exists between the first signal path 401 and the second signal path 402. As explained above, such length mismatch may result in voltage crossover offset violation, which may cause an increase in the common mode signal at least in regions of transition of the differential signals (e.g., region 411). Where the positive signal P and negative signal N are each transmitted from a signal source 410 at the same time, the signal traveling the shorter signal path (e.g., the positive signal P in the illustrated embodiment of FIG. 4A) will be received at the receiver 420 before the arrival of the signal traveling on the longer signal path, resulting in a delay, or skew, between the positive and negative signals. Such skew, as explained above, can results in a voltage crossover offset condition, which, as shown in FIG. 4B, can cause a deviation of the common mode signal as shown in the illustrated region 411.

Figure 5B:
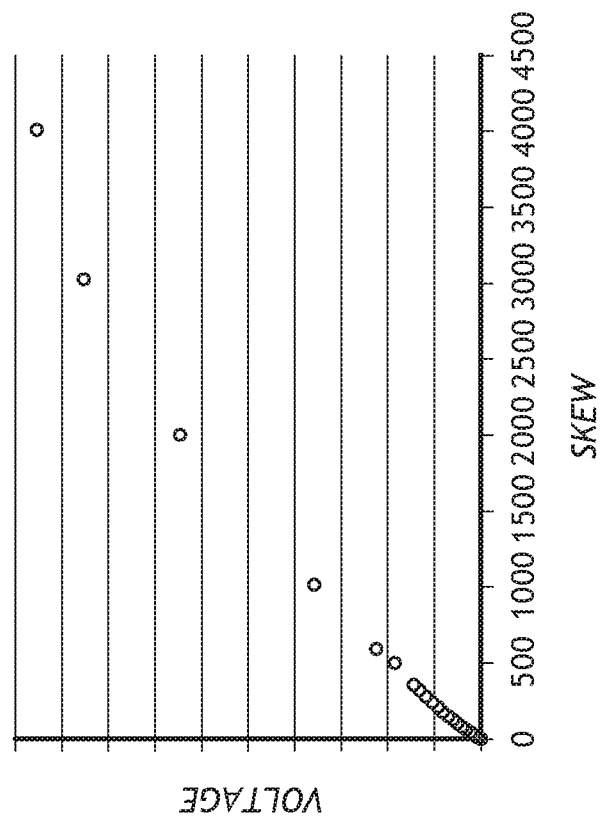
FIGS. 5A and 5B are graphs illustrating the impact of voltage crossover offset on common mode signals at first and second frequencies of operation, respectively.
Figure 5A:
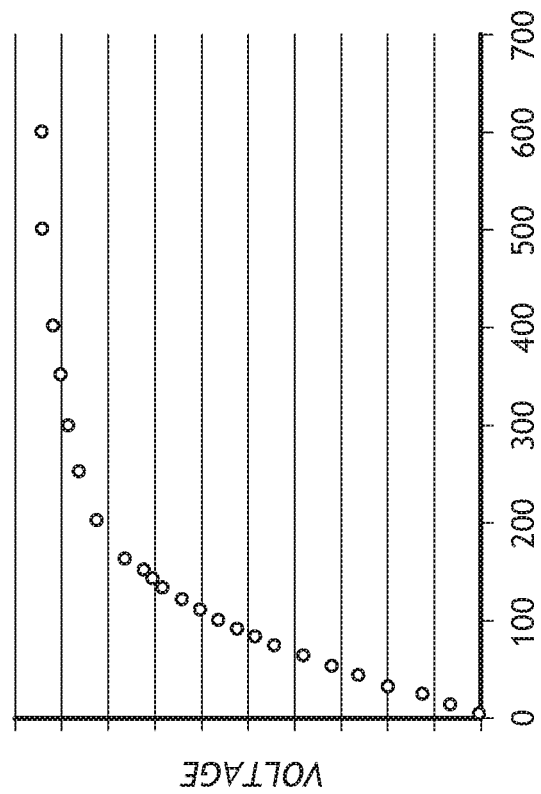

FIGS. 5A and 5B are graphs illustrating the impact of voltage crossover offset on common mode signals at first and second frequencies of operation, respectively. For example, the graph of FIG. 5A may correspond to a frequency of 5.83 Gbps (e.g., 17.1 ps rise time), whereas the graph of FIG. 5B may correspond to an operational frequency of approximately 200 Mbps (e.g., 0.5 ns rise time). The graphs of FIGS. 5A and 5B illustrate that, in certain embodiments, at higher frequencies, the common mode noise may saturate in the presence of relatively smaller skew between differential signals compared to lower-frequency operation. This is due to the relatively shorter rise time at higher frequencies, which may result in overlapping of high and/or low values of the complementary signals in the presence of relatively shorter skew. Therefore, lower-frequency applications may allow for a greater degree of skew between complementary signals before common mode saturation occurs.

Data Storage System

Figure 6:
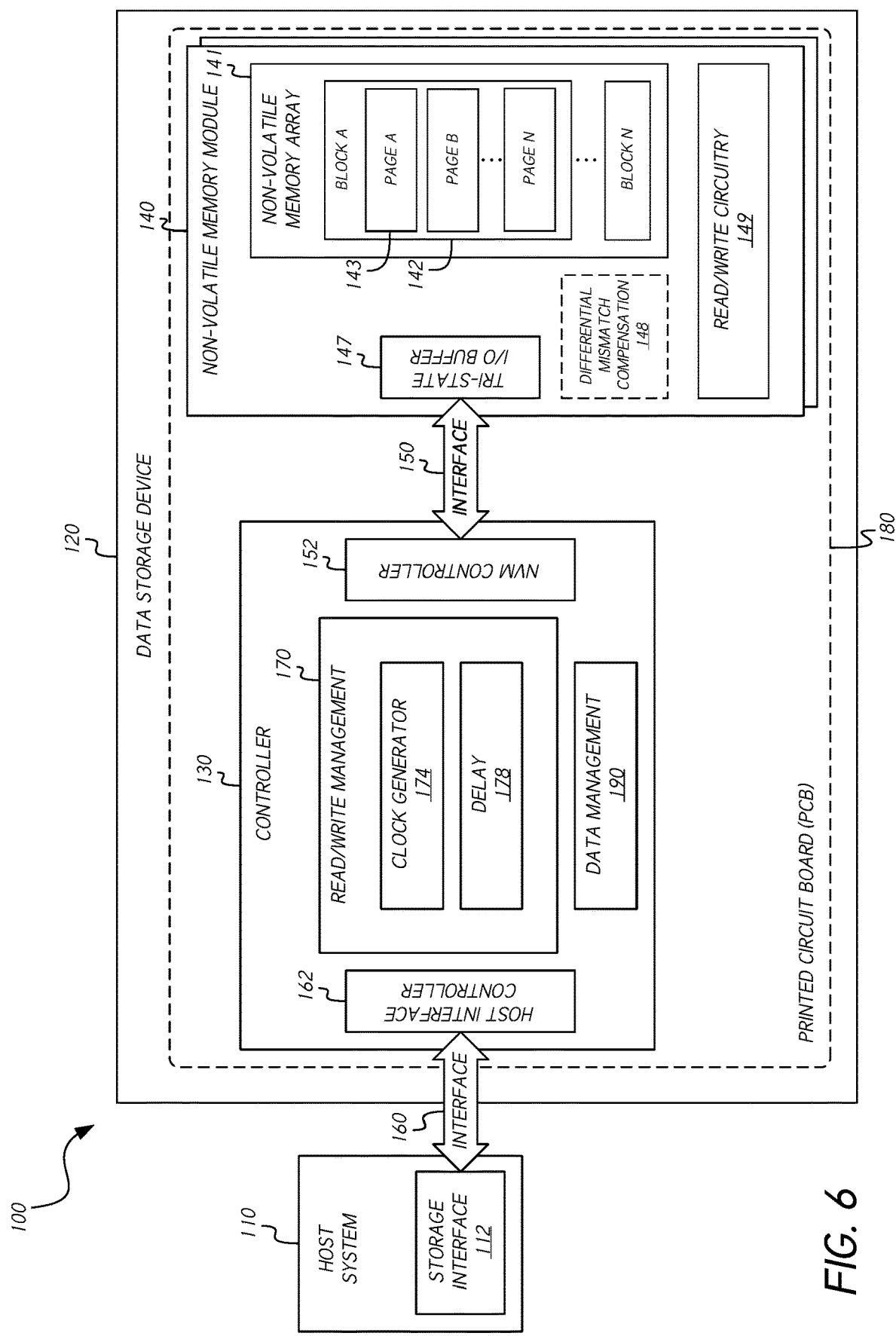
FIG. 6 is a block diagram illustrating an embodiment of a system including a combination of a host system and a data storage device incorporating differential signal mismatch compensation in accordance with one or more embodiments.

FIG. 6 is a block diagram illustrating an embodiment of a system 100 including a combination of a host system 110 and a data storage device 120 incorporating differential signal mismatch compensation in accordance with one or more embodiments disclosed herein. The data storage device 120 may be any type storage device, module, component, system, or the like. Furthermore, the terms "drive" and "data storage drive" may be used herein in certain contexts refer to any type storage device, and may be used substantially interchangeably with the term "data storage device" in some contexts. For example, the terms "drive," "solid-state drive," and the like, may be used to refer to a data storage device, which may be embodied in a board having one or more solid-state memory chips mounted thereon or associated therewith, wherein the board may be disposed within a housing, or the like. With respect to the system 100 of FIG. 6, the terms "data storage drive" and/or "solid-state drive" may refer to the data storage device 120 and/or the nonvolatile memory module 140.

Although FIG. 6 illustrates a data storage system 100, it should be understood that the differential mismatch compensation principles and embodiments disclosed herein may be applicable to any type of data communications system utilizing differential pair signals. Furthermore, although certain differential mismatch compensation functionality is described herein as implemented by the controller of a data storage device, it should be understood that such functionality may be implemented using any control circuitry of a data storage system or other computing system.

The data storage device 120 includes a controller 130 and one or more nonvolatile memory modules or devices 140. Although certain embodiments are disclosed herein in the context of a single nonvolatile memory module 140, it should be understand that the data storage device 120 may comprise a plurality of non-volatile memory modules (e.g., solid-state memory chips/dies) that are controlled at least in part by the controller 130. In certain embodiments, one or both of the controller 130 and the nonvolatile memory module 140 may be mounted to a printed circuit board 180. In certain embodiments, the controller 130 and nonvolatile memory 140 are mounted to separate boards.

The controller 130 (e.g., control circuitry) of the data storage device 120 (e.g., hybrid hard drive, solid-state drive, or any storage device utilizing solid-state memory, etc.) is configured to receive data commands from the host system 110, and to execute such commands in the nonvolatile memory module 140. The commands receive and/or executed by the controller 130 may include, for example, read/write commands, and the like. The controller 130 may comprise one or more processors, memory devices, data and/or power transmission channels/paths, boards, chips, dies, or the like. In certain embodiments, one or more components of the controller 130 may be mounted on the printed circuit board (PCB) 180. The controller 130 may be configured to receive data commands from a storage interface (e.g., a device driver) 112 residing on the host system 110. The controller 130 may communicate with the host system 110 over a host interface 160 and receive the data storage access commands using the host interface 160. The host interface 160 may comprise any suitable or desirable communication protocol, including, but not limited to, Universal Serial Bus (USB), Small Computer System Interface (SCSI), Peripheral Component Interconnect Express (PCIe), Universal Flash Storage (UFS), or the like.

The data storage device 120 is configured to store data received from the host system 110, such that the data storage device 120 acts as data storage for the host system 110. To facilitate this function, the controller 130 can implement a logical interface. The logical interface can present to the host system 110 memory as a set of logical addresses (e.g., sequential/contiguous addresses) where data can be stored. For example, host data storage access commands may specify a logical block address in the data storage device 120. Internally, the controller 130 may be configured to map the logical addresses to respective physical memory addresses in the nonvolatile (e.g., solid-state) memory module 140 and/or other memory module(s). For example, the data management module 190 may be configured to implement logical-to-physical mapping functionality. In certain embodiments, mapping data may be loaded from the nonvolatile memory module 140. The mapping data may be flushed to the nonvolatile memory module 140 prior to power down of the data storage device 120 in order to allow for the restoration of the mapping data following a power cycle. The mapping data may comprise one or more mapping tables, which may be periodically and/or sporadically updated to reflect locations of data within the nonvolatile memory module 140.

In certain embodiments, the nonvolatile memory array 141 comprises one or more blocks of storage, identified as Block "A" 142 through Block "N." Each block may comprise a plurality of pages. For example, Block A 142 of FIG. 6 includes a plurality of pages, identified as pages A 143, B, through N. In some embodiments, each page is a smallest grouping of memory cells in the nonvolatile memory array 141 that can be programmed in a single operation or as a unit. Further, each page may include a plurality of code words, such as error-correcting pages.

The controller 130 is configured to send data and commands to the nonvolatile memory module 140 and to receive read data from the nonvolatile memory module 140. For example, the controller 130 is configured to send data with write commands to cause the memory 140 to store the data to a specified address of the memory module 140. The write command may specify a physical address of a portion of the memory array 141 140 (e.g., a physical address of a word line of the memory array) that is to store the data. The controller 130 may also be configured to send data and commands to the memory module 140 associated with background scanning operations, write leveling, garbage collection operations, and/or wear leveling operations, etc., as illustrative, non-limiting examples. The controller 130 may be configured to send read commands to the non-volatile memory module 140 to access data from specified addresses of the memory module 140. Read commands may specify the physical address of a portion of the memory array 141 (e.g., a physical address of a word line of the memory array). Execution of write and/or read commands in the nonvolatile memory module 140 may be facilitated timing signals received by the non-volatile memory module 140 from the controller 130.

The controller device or module 130 may comprise one or more processors, memory modules, as well as interconnect components for data and/or power communication. The circuitry of the controller 130 may comprise electronics configured to bridge the nonvolatile memory module 140 and/or components thereof to the host input/output interface 160. In certain embodiments, the controller 130 comprises an embedded processor configured to execute firmware-level code for managing the functionality of the data storage device at least in part.

The controller 130 may comprise one or more data buses, and/or control circuitry for managing one or more nonvolatile memory module, including the module 140. In certain embodiments, the controller 130 is configured to communicate with the nonvolatile memory module 140 over an interface 150 conforming to a suitable communication protocol, such as Open NAND Flash Interface (ONFI). In certain embodiments, the data storage device 120 comprises a plurality of controllers, wherein each controller is designated and/or configured to indicate and/or manage one or more nonvolatile memory devices or modules.

The host interface controller 162 may provide an electrical interface between the host system 110 and the data storage device 120. For example, the host interface controller 162 may be designed to communicate with the specific interface specification of the interface 160 connecting the host system 110 to the data storage device 120. The host interface controller 162 may comprise the native electrical interface for an open system standard. For example, the interface 160 and host interface controller 162 may be configured to operate according to any suitable or desirable communication interface standard, such as Serial ATA (SATA), Fibre Channel (FC), Serial Attached SCSI (SAS), Advanced Technology Attachment/Integrated Drive Electronics (ATA/IDE), Peripheral Component Interconnect Express (PCIe), Universal Serial Bus (USB), FireWire, Universal Flash Storage (UFS), or other communication protocol. In certain embodiments, the interface controller 162 is controlled at least in part by the firmware executed by the controller 130.

The controller 130 includes read/write management circuitry 170, which may comprise one or more functional components or modules for implementing read/write logic and/or signal processing. The read/write management circuitry 170 includes a clock generator 174, which may be configured to generate a clock signal, or other timing or strobe signal. The clock generator 174 may comprise one or more resonant circuits, amplifiers, oscillators (e.g., piezoelectric oscillator(s)), tank circuits, RC circuits, latches, switches, or the like. The timing signals generated by the clock generator 174 may be used to signal when data provided to the nonvolatile memory 140 over the interface 150 should be sampled by the nonvolatile memory 140, and/or may be used by the nonvolatile memory 140 to generate internal timing signals for use in read operations, for example. The interface 150 and/or other connectivity circuitry between the clock generator 174 and the input output buffer 147 of the nonvolatile memory 140 may include differential pair signal paths for transmitting differential timing signals. For example, the clock generator 174 may be configured to generate timing signal pairs comprising a true signal and a complementary signal, which is an inverted version of the true signal. The controller 130 may be configured to send the differential pair timing signal along with write data, for example, to the nonvolatile memory 140, wherein the differential timing signal may be used to decode the write data. For purposes of the present disclosure, a differential signal comprising two separate complementary signals (i.e., true and complementary signal) may be referred to in the singular (e.g., as a single "signal") or plural (e.g., as a pair of "signals") form, depending on context. In some implementations, the controller 130 is configured to communicate with the nonvolatile memory module(s) 140 over a plurality of channels. For example, each channel may be used to transmit a differential timing signal and a plurality of parallel data transmission lines (e.g., eight data lines per channel).

The controller 130 and/or read/write management circuitry 170 may be configured to implement differential mismatch compensation in accordance with one or more embodiments of the present disclosure. For example, the read/write management circuitry 170 may comprise a delay component 178, which may be configured to introduce a relative delay between the differential signals of a differential pair timing signal. For example, the delay component 178 may be configured to push or pull either or both of the signals of a differential pair signal in order to adjust or eliminate an offset present between the signals, which may be caused by transmission path length mismatch, for example. The delay component 178 may be configured to implement the delay according to a level of granularity of the delay component. For example, the delay component 178 may be configured to execute a delay step size corresponding to a certain period of time, such as a 20 ps step size, or less. In certain embodiments, the delay component 178 is configured to execute a delay on a differential signal as low as 1 ps or less, or between 1-2 ps, or between 2-3 ps. In certain embodiments, the step size of the delay component is between 3-5 ps, 5-10 ps, 10-15 ps, or 15-20 ps. Relatively shorter step sizes may advantageously allow for relatively higher frequency operation with respect to the differential mismatch compensation. In certain embodiments, the read/write management circuitry 170 provides for analog-to-digital conversion of data signals received from the nonvolatile memory 140, and/or digital-to-analog version of data signals sent to the host system 110 and/or one or more other components of 130.

The amount of length of mismatch of the differential signal transmission paths that may be tolerated by the controller 130 when implementing differential mismatch compensation may be dependent at least in part on the step size of the delay component 178. For example, in an embodiment where the delay component 178 configured to shift signals in steps of 20 ps, where the rise time of the toggled timing signal is approximately 187 ps, the differential delay compensation system may allow for a granularity of up to nine steps of delay that may be introduced in one of the differential signals, which may translate to approximately 990 mils or 25146 μm length mismatch. That is, such a design may be able to tolerate a length mismatch between the transmission paths of the differential pair of up to 990 mils or 25146 μm at such a frequency of operation.

The delay component 178 may comprise any suitable or desirable delay circuitry, and may comprise one or more buffers, serially-coupled inverters, or a combination thereof. For example, the delay component 178 may comprise one or more delay-locked loops (DLLs), which may be configured to change the phase of one or both of the differential timing signals generated by the clock generator 174. Such a DLL may comprise a delay chain composed of a plurality of delay gates connected serially, wherein the input of the chain is coupled to the signal that is to be delayed. A multiplexer may be connected to one or more stages of the delay chain, wherein the selector of the multiplexer may be controlled to produce a delay effect, such as a negative delay effect, such that the output of the DLL provides a negatively delayed representation of the timing signal. In certain embodiments, the DLL compares the phase of its last output with the input signal to generate an error signal that used as feedback for controlling the delay element(s).

The controller 130 may further comprise one or more additional data management components 190, which may be configured to provide functionality such as cash management, power saving/sleep state management, thermal management, data integrity, compression, encryption, failure recovery or prevention, quality of service functionality, and/or other functionality. The data management circuitry 190 may further provide write leveling, logical-to-physical address mapping, wear leveling, bad block management, garbage collection, error-correction, and/or the like.

The nonvolatile memory module 140 may comprise a solid-state memory chip or die, which may be mounted to the printed circuit board 180, or other board. In certain embodiments, the nonvolatile memory module 140 comprises read/write circuitry 149, which may be configured to read and write data to and/or from the nonvolatile memory array 141. In some embodiments, the read/write circuitry 149 and/or I/O buffer 147 may present an interface through which the controller can interact to store in, and retrieve data from, the nonvolatile memory array 141. The read/write circuitry 149 may perform memory operations on the memory array 141. The read/write circuitry and/or differential mismatch compensation circuitry 148 may include control logic, such as one or more state machines, processors, or the like, to provide on-chip control functionality. For example, the read/write circuitry 149 may provide die- or chip-level control of low-level memory operations (e.g., via an internal bus for carrying control signals, data and/or addresses).

In embodiments comprising differential mismatch compensation circuitry 148, which may be embodied in one or more controllers, or other chip(s)/die(s) or device(s), the differential mismatch compensation module 148 may be configured to implement certain differential mismatch detection and/or compensation functionality in accordance with embodiments of the present disclosure. For example, the module 148 may be configured to implement one or more of the steps illustrated in FIGS. 9 and 10 and described in detail below, such as determination of delay mismatch caused by signal transmission path length mismatch, generation of data indicating such delay, and/or providing delay data to the controller 130.

The interface 150 coupling the controller 130 with the nonvolatile memory 140 may comprise a command bus for communication between the controller 130 and the nonvolatile memory module 140. The interface 150 may comprise a plurality of parallel data transmission paths, which may be used to transmit one or more of a clock enable, chip select, row and/or column address, bank address, and/or write enable signals. The interface 150 may be any suitable or desirable communication interface, such as, for example, ONFI, or the like. The interface 150 may include one or more channels to enable the controller 130 to communicate with a single memory module (e.g. module 140) of a group of memory modules. In some embodiments, the interface 150 includes multiple channels to enable the controller 130 to communicate with memory modules/dies in parallel. In certain embodiments, the nonvolatile memory module 140 comprises a plurality of banks of memory devices, wherein a control line selects the bank to be active on the interface for a specific channel. As used herein, the term "channel" may refer to a subgroup of memory modules that the controller 130 may communicate with in parallel through the interface 150.

In certain embodiments, commands are entered at the nonvolatile memory module 140 on the positive edges of a timing signal, such as a positive edge of one of the complementary timing signals generated and provided by the read/write management circuitry 170, whereas data sampling may occur on both positive and negative edges of the timing signal(s), or vice versa. In the embodiment of FIG. 6, the nonvolatile memory module 140 utilizes a differential pair for the system clock, and therefore is configured to process both a true clock, or timing, signal, as well as a complementary clock, or timing, signal. In some embodiments, commands and/or data are entered or sampled at the cross point of differential signal pair, which is the point where the rising timing signal crosses with the falling timing signal in a transition period.

The nonvolatile memory array 141 may have any suitable or desirable cell design, such as, for example re-RAM, PCM, CT, FG, resistive cell, or other cell design or architecture. Each of the nonvolatile memory modules of the data storage device 120 may be connected to a number of data lines, as well as timing or strobe lines. For example, each of the nonvolatile memory modules (e.g., nonvolatile memory module 140) can include eight data lines and a corresponding strobe or timing line (DQS). Data may be synchronously transmitted based on the state of the DQS line, which may comprise a differential pair of signals, as described herein. In certain embodiments, data is double pumped, wherein the data is sampled on rising and falling edges of the timing signal. The nonvolatile memory devices may further receive additional control and/or timing lines, such as one or more system clocks, address and/or command lines.

The nonvolatile memory module 140 includes an I/O buffer 147, which may advantageously be a tri-state I/O buffer. Characteristics of the buffer 147 may allow for the buffer to assume a high-impedance state as coupled to the interface 150. When in the high-impedance state, the tri-state I/O buffer 147 may present a substantially open circuit to the interface 150, which may be useful in implementing certain differential mismatch compensation schemes or mechanisms in accordance with the present disclosure, as described in greater detail below. During differential mismatch compensation training, as described in detail herein, the clock/timing line(s) may be held in the tri-state (i.e., high-impedance state).

In order to implement differential mismatch compensation in accordance with the present disclosure, the controller 130 may be configured to determine length mismatch within the differential pair signal lines used for transmitting the differential timing signal. For example, mismatch within the differential pair within the controller 130 and/or the board 180 may be determined using any suitable or desirable mechanism, such as through the use of time-domain reflectometry. In some implementations, the data storage device 120 is configured to implement a training process to determine an amount of delay to be introduced to one or both of the differential pair timing signals generated by the clock generator 174 and provided to the nonvolatile memory module 140 of the interface 150. Such training may involve determining a mismatch between the transmission paths of the differential signal components and introducing a delay to offset the detected or determined mismatch in order to facilitate the arrival of the true and complementary components of the differential timing signal at the nonvolatile memory module 140 substantially at the same time, or in-phase.

Mismatch Compensation

Figure 7:
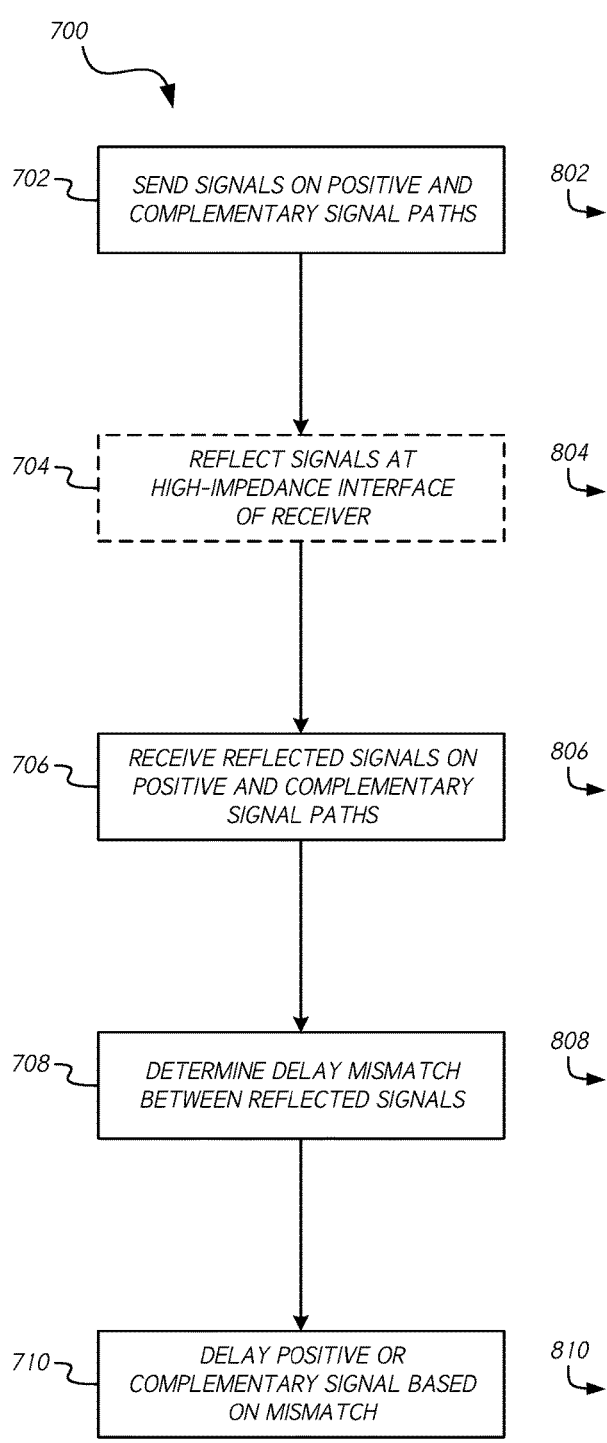
FIG. 7 is a flow diagram illustrating a process for implementing differential mismatch compensation in accordance with one or more embodiments.
Figure 8:
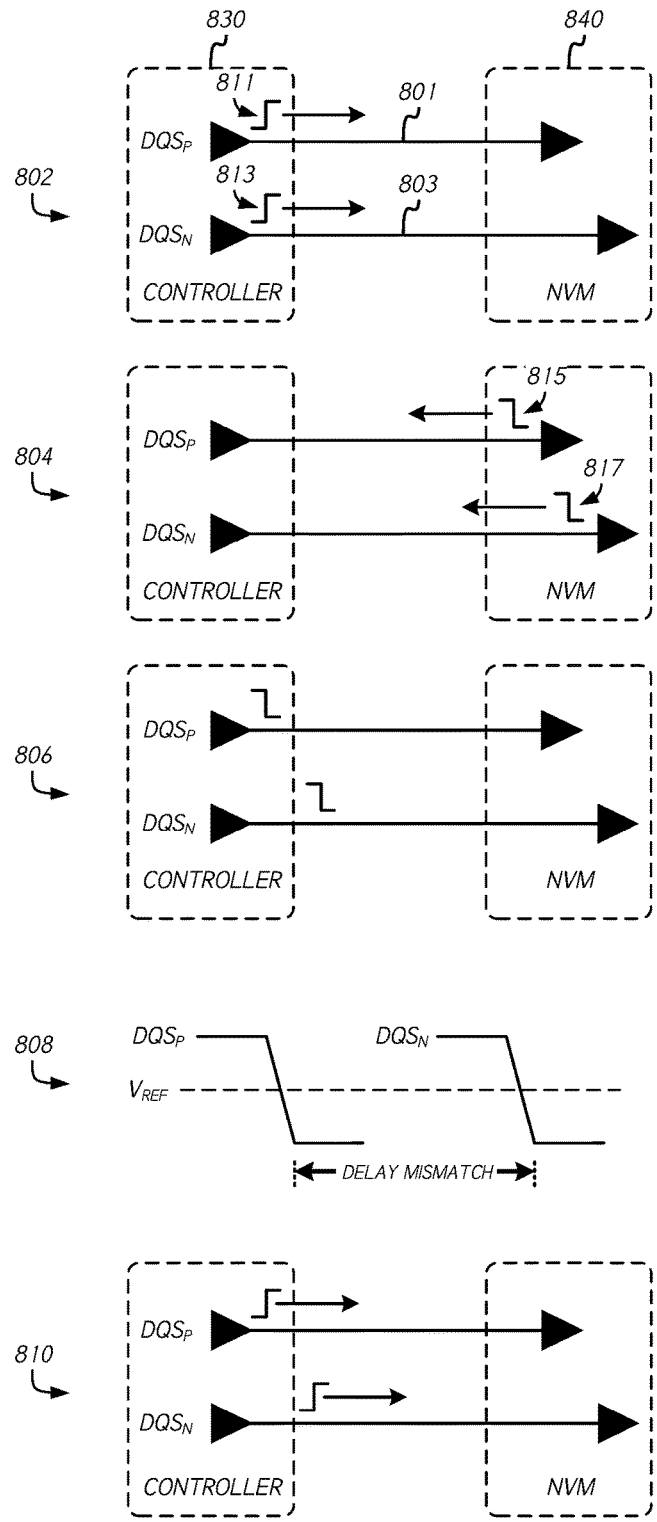
FIG. 8 illustrates block diagrams corresponding to the various steps of the process of FIG. 7 in accordance with one or more embodiments.

FIG. 7 is a flow diagram illustrating a process 700 for implementing differential mismatch compensation in accordance with one or more embodiments of the present disclosure. FIG. 8 illustrates block diagrams corresponding to the various steps of the process 700 to further illustrate features of the described embodiments. In some implementations, the process 700 is implemented in whole or in part by a controller of a data storage device, which may advantageously allow for the controller to be designed for a particular product or system. In some implementations, the process 700 may be implemented without requiring utilization of logic in the associated nonvolatile memory module, such that the functional steps of the process 700 are implemented outside of the nonvolatile memory module, such as in the controller of the data storage device. In some embodiments, the process 700 may be implemented in connection with, or response to, system boot up of the data storage device or system, or associated computing device or system.

At block 702, the process involves sending signals on first 801 (e.g., positive) and second 803 (e.g., complementary) signal paths, respectively, between components of the computing system, such as a data storage device or system. The signals sent in connection with block 702 and stage 802 may be differential signals, or may be single-ended signals (e.g., positive or complementary edge). As an example, with reference to FIG. 8, and in particular to stage 802 of FIG. 8, the step 702 of the process 700 may involve sending a positive pulse or other signal (811, 813) on both a first signal path 801 and a complementary signal path 803. The pulse or other signal may be considered a test, or training, signal. In certain embodiments, the first signal path 801 may correspond to a positive, or true, signal path for a differential timing signal, whereas the signal path 803 may correspond to a negative, or complementary, signal path of the differential signal. In certain embodiments, the signal (811, 813) may be sent from a controller 830 of the data storage device or other computer or data storage component, while the sent signal may be received at a nonvolatile memory module 840 coupled to the controller via the communication paths 801, 803.

At block 704, the process 700 involves the reflection of the signal sent in connection with step 702 at a receiver interface, such as a receiver interface associated with the nonvolatile memory module or device 840. In certain embodiments, the receiver interface presents a relatively high impedance to the transmission paths, such that the signals transmitting on the signal paths are at least partially reflected at the receiver and directed back towards the sender (e.g., controller 830). The reflected signals 815, 817 may be considered reflected signals or reflected versions of the signals 811, 813, respectively. In certain embodiments, the signals propagating on the transmission paths 801 803 are reflected substantially entirely due to the high impedance of the receiver. For example, the receiver interface at the nonvolatile memory module 840 may be configured to implement a tri-state I/O impedance. In certain embodiments, the I/O interface of the nonvolatile memory module 840 is configured to assume a high-impedance state as a default state when the I/O interface of nonvolatile memory module 840 is not set for input or output communication.

At block 706, the process 700 involves receiving the reflected signals on the positive and complementary signal paths, respectively. As shown, in certain embodiments, the trace length of the differential signal paths may be at least partially mismatched, wherein one of the signal paths is longer by some amount than the other signal path. Although certain illustrations and embodiments are described herein in the context of a length mismatch wherein the negative (i.e., complementary) signal path is longer than the positive (i.e., true) signal path, it should be understood that the principles and embodiments disclosed herein are likewise applicable to embodiments in which the positive (i.e., true) signal path is longer than the negative (i.e., complementary) signal path. Due to the mismatch in signal path length between the first and second signal paths, the reflected signals may be received back at the signal source (e.g., controller 830) at different, or offset, times.

At block 708, the process 700 involves determining the delay mismatch between the reflected signals received on the first and second signal paths. For example, the delay mismatch may be determined by determining the difference in propagation time between the positive/true signal and the negative/complementary signal, and dividing such difference by two to reflect the length of travel as traversing two lengths of the respective signal path. In certain embodiments, the delay mismatch may be calculated in terms of picoseconds, or other time-related metric. The stage 808 of FIG. 8 illustrates the mismatch between signals according to one embodiment. The following equation may be used to calculate the delay mismatch:

$$DM=(tP-tN)/2 \qquad (1)$$

where DM is the delay mismatch, tP is the total propagation time of the positive signal of the differential pair, and tN is the total propagation time of the complementary signal of the differential pair. Using such equation, a positive value of the delay mismatch indicates that a positive trace of the differential pair is longer, and a negative value of the delay mismatch indicate that the complementary trace differential pair is longer. The total propagation times for the positive signal and the complementary signal may be determined at least in part by the times or receipt of the respective reflected versions of the positive signal and the complementary signal vis-à-vis the times that the respective signals were sent.

At block 710, the process 700 involves delaying the positive or complementary signal based on the determined mismatch. For example, the launch of the signal associated with the shorter signal path may be delayed by an amount of time associated with or equal to the calculated mismatch, such that both the positive signal and the complementary signal arrive at the receiver at substantially the same time, or within an acceptable time or range of one another. In certain embodiments, the delay value may be implemented using a delay locked loop (DLL) or other delay component(s) associated with the controller of a data storage device, wherein the delay value is implemented on one of the signals. The delay may be introduced in one of the signals of the signal pair in the digital domain. The delay component (e.g., DLL)

may shift one of the differential pair signals by a positive or negative value depending on the determined delay mismatch. In some embodiments, the delay component is configured to implement delays using a 20 ps step size, or less. For example, the step size may be as low as 1 ps, between 1-2 ps, between 2-3 ps, between 3-5 ps, between 5-10 ps, between 10-15 ps, and/or between 15-20 ps. Smaller steps sizes may advantageously allow for utilization in higher-frequency applications. In certain embodiments, the process 700 may involve associating the determined delay mismatch, as calculated and described above, with a discrete step size or multiple of a step size to produce a delay that most closely matches the determined actual delay of the signals.

The training implemented in process 700 may be applicable to the delay of write timing signals as well as read timing signals, which may be used by the nonvolatile memory module to generate timing signals for sending with retrieved data. In some embodiments, the same delay value is used for read and write operations.

FIG. 9 is a flow diagram illustrating a process 900 for implementing differential mismatch compensation in accordance with one or more embodiments of the present disclosure. FIG. 10 illustrates block diagrams corresponding to the various steps of the process 900 to further illustrate features of the described embodiments. In some implementations, the process 900 is implemented in whole or in part by a nonvolatile memory module 1040, or controller thereof, or device of a data storage system. In some implementations, the process 900 may be implemented by a nonvolatile memory module, or controller thereof, in combination with a controller of the data storage device or system. In some embodiments, the process 900 may be implemented in connection with, or response to, system boot-up of the data storage device or system, or associated computing device or system.

At block 902, the process involves sending signals (1011, 1013) on first 1001 (e.g., positive) and second 1003 (e.g., complementary) signal paths, respectively, between components of the computing system, such as a data storage device or system. The signals sent in connection with block 902 and stage 1002 may be differential signals, or may be single-ended signals (e.g., positive or complementary edge). As an example, with reference to FIG. 10, and in particular to stage 1002 of FIG. 10, the step 902 of the process 900 may involve sending a positive pulse and/or other signal on a first signal path 1001 and a complementary signal path 1003. In certain embodiments, a positive pulse is sent on the first signal path 1001 and a negative pulse is sent on the second signal path 1003. The first signal path 1001 may correspond to a positive, or true, signal path for a differential timing signal, whereas the signal path 1003 may correspond to a negative, or complementary, signal path of the differential signal. In certain embodiments, the signal may be sent from a controller 1030 of the data storage device or other computer or data storage component, while the sent signal may be received at a nonvolatile memory module 1040 coupled to the controller 1030 via the communication paths 1001, 1003.

At block 904, the process 900 involves receiving and/or sampling the signals (1011, 1013) sent on the first 1001 and second 1003 signal paths at the receiver of, for example, the nonvolatile memory module 1040. At block 906, the process 900 involves determining a delay mismatch between the signals received at the receiver. For example, delay mismatch value may be determined by determining a difference and arrival time between the signal transmitted on the first path 1001 and the signal transmitted on the second path 1003.

At block 908, the process 900 involves transmitting delay mismatch information 1007 on one or more signal paths from the receiver (e.g., nonvolatile memory module 1040) back to the signal source (e.g., controller 1030). For example, the determined delay value may be digitized and sent back using a pre-defined bit sequence, or other data representation, on one or more data lines of an interface connecting the module 1040 with the module 1030. The delay value may be a positive or negative value depending on whether the positive signal 1011 or negative signal 1013 is received first in connection with block 904.

The delay information 1007 provided by the module 1040 may be used by the module 1030 to insert a delay in one or both of the signals of the differential pair during future transmissions. For example, module 1030 (e.g., controller) may determine an appropriate delay value based on the received delay information 1007, and utilize a delay component, such as a delay-locked loop, or the like, to inserts a delay in signals transmitted to the nonvolatile memory 1040, such as timing signals as described herein. Depending on the delay value associated with the delay data 1007, the delay component of the module 1030, or otherwise associated with the signal path(s) 1001, 1003, may delay one of the signals such that both signals reach the receiver module 1040 at substantially the same time, or within an acceptable range of time.

At block 910, the process 900 involves receiving signals on the first 1001 and second 1003 signal paths at the receiver module 1040 (e.g., nonvolatile memory module), wherein one of the signals is delayed relative to the other in accordance with the delay information 1007, such that both signals arrive in phase at substantially the same time at the receiver, or within an acceptable range of one another. That is, one of the signals may be delayed in accordance with the delay information 1007 (e.g., a delay mismatch value, or the like), wherein the signal being delayed in accordance with the delay information 1007 may be understood to mean that the signal is delayed by an amount that is associated with, commensurate with, or otherwise related to or based on, the amount of delay or delay mismatch indicated by the delay information 1007. For example, the amount of delay may not match the measured delay (determined in connection with block 906), but may be discrete delay interval approximated based on the measured delay or delay information 1007. The training implemented in process 900 may be applicable to the delay of write timing signals as well as read timing signals, which may be used by the nonvolatile memory module to generate timing signals for sending with retrieved read data. In some embodiments, the same delay value is used for read and write operations.

Additional Embodiments

Those skilled in the art will appreciate that in some embodiments, other types of data storage systems and/or signal transmission schemes can be implemented. In addition, the actual steps taken in the processes discussed herein may differ from those described or shown in the figures. Depending on the embodiment, certain of the steps described above may be removed, others may be added.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. The accompanying claims and their equivalents are intended to cover such forms or modifications as would fall within the scope and spirit of the protection. For example, the various components illustrated in the figures may be implemented as software and/or firmware on a processor, ASIC/FPGA, or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

Methods and processes described herein may be embodied in, and partially or fully automated via, software code modules executed by one or more general and/or special purpose computers. The word "module" may refer to logic embodied in hardware and/or firmware, or to a collection of software instructions, possibly having entry and exit points, written in a programming language, such as, for example, C or C++. A software module may be compiled and linked into an executable program, installed in a dynamically linked library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an erasable programmable read-only memory (EPROM). "Module" may further refer to one or more devices, components, systems, or subsystems, which may conceptually implement relevant functionality. It will be further appreciated that hardware modules may be comprised of connected logic units, such as gates and flip-flops, and/or may be comprised of programmable units, such as programmable gate arrays, application specific integrated circuits, and/or processors. The modules described herein are preferably implemented as software modules, but may be represented in hardware and/or firmware. Moreover, although in some embodiments a module may be separately compiled, in other embodiments a module may represent a subset of instructions of a separately compiled program, and may not have an interface available to other logical program units.

What is claimed is:

1. A non-volatile memory module comprising:
an input/output buffer coupled to first and second signal transmission paths; and
control circuitry coupled to the input/output buffer, the control circuitry being configured to:
receive a first signal on the first signal transmission path from a controller chip communicatively coupled to the non-volatile memory module;
receive a second signal on the second signal transmission path from the controller chip;
determine a delay between the first signal and the second signal;
generate a delay mismatch value based on the determined delay;
transmit, to the controller chip, the delay mismatch value on one or more signal transmission paths coupled to the input/output buffer;
receive a true signal of a complementary signal pair on the first signal transmission path; and
receive a complementary signal of the complementary signal pair on the second signal transmission path;
wherein one of the true signal and the complementary signal is delayed in accordance with the delay mismatch value.

2. The non-volatile memory module of claim 1, wherein the first and second signal transmission paths are at least partially integrated with a printed circuit board on which at least one of the non-volatile memory module and the controller chip is mounted.

3. The non-volatile memory module of claim 1, wherein the control circuitry is further configured to determine the delay based on a difference in a receipt time associated with the first signal and a receipt time associated with the second signal.

4. The non-volatile memory module of claim 1, wherein the first and second signals are pulse signals.

5. The non-volatile memory module of claim 1, wherein the first signal is a true signal of a differential timing signal and the second signal is a complementary signal of the differential timing signal.

6. The non-volatile memory module of claim 1, wherein:
the delay mismatch value is positive when the first signal is received prior to receiving the second signal; and
the delay mismatch value is negative when the second signal is received prior to receiving the first signal.

7. The non-volatile memory module of claim 1, wherein the control circuitry is further configured to transmit the delay mismatch value as a digital signal.

8. The non-volatile memory module of claim 7, wherein the delay mismatch value comprises a sequence of bits.

9. A method operational in a non-volatile memory module for compensating for a delay mismatch in signal transmission paths, the method comprising:
receiving, at an input/output buffer of the non-volatile memory module, a first signal on a first signal transmission path from a controller chip communicatively coupled to the non-volatile memory module;
receiving, at the input/output buffer of the non-volatile memory module, a second signal on a second signal transmission path from the controller chip;
determining a delay between the first signal and the second signal;
generating a delay mismatch value based on the determined delay;
transmitting, to the controller chip, the delay mismatch value on one or more signal transmission paths coupled to the input/output buffer;
receiving a true signal of a complementary signal pair on the first signal transmission path; and
receiving a complementary signal of the complementary signal pair on the second signal transmission path;
wherein one of the true signal and the complementary signal is delayed in accordance with the delay mismatch value.

10. The method of claim 9, wherein said determining the delay is based on a difference in a receipt time associated with the first signal and a receipt time associated with the second signal.

11. The method of claim 9, wherein the delay mismatch value is transmitted as a digital signal.

12. A computing device comprising:
an input/output buffer coupled to first and second signal transmission paths; and control circuitry coupled to the input/output buffer, the control circuitry being configured to:
- receive a first signal on the first signal transmission path from a computing module communicatively coupled to the computing device;
- receive a second signal on the second signal transmission path from the computing module;
- determine a delay between the first signal and the second signal;
- generate a delay mismatch value based on the determined delay;
- transmit, to the computing module, the delay mismatch value on one or more signal transmission paths coupled to the input/output buffer;
- receive a true signal of a complementary signal pair on the first signal transmission path; and
- receive a complementary signal of the complementary signal pair on the second signal transmission path;
- wherein one of the true signal and the complementary signal is delayed in accordance with the delay mismatch value.

13. The computing device of claim 12, wherein the first and second signal transmission paths are at least partially integrated with a printed circuit board on which at least one of the computing device and the computing module is mounted.

14. The computing device of claim 12, wherein the control circuitry is further configured to determine the delay based on a difference in a receipt time associated with the first signal and a receipt time associated with the second signal.

15. The computing device of claim 12, wherein the first and second signals are pulse signals.

16. The computing device of claim 12, wherein the first signal is a true signal of a differential timing signal and the second signal is a complementary signal of the differential timing signal.

17. A non-volatile memory module comprising:
an input/output buffer coupled to first and second signal transmission paths and configured to receive, from a controller chip communicatively coupled to the non-volatile memory module, a first signal on the first signal transmission path and a second signal on the second signal transmission path; and
means for:
- determining a delay between the first signal and the second signal;
- generating a delay mismatch value based on the determined delay;
- transmitting, to the controller chip, the delay mismatch value on one or more signal transmission paths coupled to the input/output buffer;
- receiving a true signal of a complementary signal pair on the first signal transmission path; and
- receiving a complementary signal of the complementary signal pair on the second signal transmission path;
wherein one of the true signal and the complementary signal is delayed in accordance with the delay mismatch value.

18. The non-volatile memory module of claim 17, wherein the delay is based on a difference in a receipt time associated with the first signal and a receipt time associated with the second signal.

19. The non-volatile memory module of claim 17, wherein the first and second signals are pulse signals.

20. The non-volatile memory module of claim 17, wherein the means for determining the delay comprises control circuitry of the non-volatile memory module.

21. The non-volatile memory module of claim 17, wherein the first signal is a true signal of a differential timing signal and the second signal is a complementary signal of the differential timing signal.

* * * * *